(12) United States Patent
Coath et al.

(10) Patent No.: US 7,460,710 B2
(45) Date of Patent: Dec. 2, 2008

(54) CONVERTING DIGITAL IMAGES CONTAINING TEXT TO TOKEN-BASED FILES FOR RENDERING

(75) Inventors: Adam Brian Coath, Seattle, WA (US); Frederick Ziya Ramos Akalin, Seattle, WA (US); Robert L. Goodwin, Mercer Island, WA (US); Joshua Shagam, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 384 days.

(21) Appl. No.: 11/392,213

(22) Filed: Mar. 29, 2006

(65) Prior Publication Data

US 2007/0237401 A1    Oct. 11, 2007

(51) Int. Cl.
*G06K 9/34* (2006.01)
(52) U.S. Cl. ...................................... 382/180
(58) Field of Classification Search ............ 382/114, 382/162, 164–165, 173, 175–181, 224–225, 382/229–230, 306, 321; 715/204, 273
See application file for complete search history.

(56) References Cited

U.S. PATENT DOCUMENTS

| | | | |
|---|---|---|---|
| 5,523,946 A * | 6/1996 | Kaplan et al. | 704/2 |
| 5,787,386 A * | 7/1998 | Kaplan et al. | 704/8 |
| 6,064,767 A * | 5/2000 | Muir et al. | 382/190 |
| 6,562,077 B2 * | 5/2003 | Bobrow et al. | 715/204 |
| 6,621,941 B1 * | 9/2003 | Syeda-Mahmood et al. | 382/306 |
| 7,272,258 B2 * | 9/2007 | Berkner et al. | 382/176 |
| 2004/0146199 A1 | 7/2004 | Berkner | |

* cited by examiner

*Primary Examiner*—Jose L Couso
(74) *Attorney, Agent, or Firm*—Christensen O'Connor Johnson Kindness PLLC

(57) ABSTRACT

A computer-implemented method is provided for converting a scanned-in electronic image into a token-based file. The method includes generally five steps. First, various tokens (i.e., graphical units) are identified in the electronic image. Second, the identified tokens having similar shapes are classified together to form a token group, to thereby form multiple token groups, each including one or more tokens having similar shapes. Third, in each token group, a representative token is found, which morphologically represents the shapes of tokens included in the group. Fourth, each representative token is converted into a vectorized token, which is a mathematical representation of the shape of the representative token. Fifth, each of the vectorized tokens is associated with the positions of the tokens in the electronic image represented by the vectorized token. Thus, upon rendering, the vectorized token is displayed to thereby create a page image consisting only of clean images of vectorized tokens.

28 Claims, 4 Drawing Sheets

CONVERTING DIGITAL IMAGES CONTAINING TEXT TO TOKEN-BASED FILES FOR RENDERING

FIELD OF THE INVENTION

The present invention is directed to processing of digital images, and more particularly to processing images of content having text therein.

BACKGROUND OF THE INVENTION

As the use of computers and computer-based networks continues to expand, content providers are preparing and distributing more and more content in electronic form. This content includes traditional media such as books, magazines, newspapers, newsletters, manuals, guides, references, articles, reports, documents, etc., that exist in print, as well as electronic media in which the aforesaid content exists in digital form or is transformed from print into digital form through the use of a scanning device. The Internet, in particular, has facilitated the wider publication of digital content through downloading and display of images of content. As data transmission speeds increase, more and more images of pages of content are becoming available online. A page image allows a reader to see the page of content as it would appear in print.

Despite the great appeal of providing digital images of content, many content providers face challenges when generating and storing the images of content, particularly when the accuracy of recognizing text in images is important. For example, to enable users to read page images from a book or magazine on a computer screen, or to print them for later reading, the images must be sufficiently clear to present legible text. Currently, the images are translated into computer-readable data using various character recognition techniques, such as optical character recognition (OCR) which includes digital character recognition. Although the accuracy of optical character recognition is generally high, some page images, even after undergoing OCR processing, are simply unreadable due to various artifacts. While manual correction is possible, the cost of manually correcting misidentified characters or inserting missing characters is extremely high especially when scanning a large volume of pages.

Another challenge faced by the digital content providers is the cost of storing images of content. To reduce storage costs, content providers desire to minimize the size of files used to store the images. Digital images may be represented at a variety of resolutions, typically denoted by the number of pixels in the image in both the horizontal and vertical directions. Typically, though not always, higher resolution images have a larger file size and require a greater amount of memory for storage. The cost of storing images of content can greatly multiply when one considers the number of images it takes to capture and store large volumes of media, such as books, magazines, etc. While reducing the size and resolution of images often reduces the requirements for storing the images, low resolution images eventually reach a point where the images, in particular any text contained therein, are difficult for readers to perceive when displayed. Content providers wishing to provide page images with text must ensure that the images can be rendered in sufficiently high resolution so that displayed text will be legible. Yet another challenge faced by the content providers is to provide page images that are scalable, i.e., that may be readily scaled up or down so as to be rendered, for example, on various-sized displays at relatively high resolution while ensuring the minimum quality and legibility of the text in the images.

What is needed is a method and system for reliably processing scanned-in page images including text so that the text in the page images, upon rendering, will be legible and in sufficiently high resolution, and further scalable, without requiring an excessive amount of memory space for storage.

SUMMARY OF THE INVENTION

To address the above-described problems and other shortcomings in the prior art, the present invention provides a method that can be implemented in a computer to convert pages of content that have been scanned in to a "token-based" file. As used herein, a token refers to a graphical unit, which may or may not represent a single character or a symbol. From scanned-in page images, numerous tokens are separated. Then, tokens of similar shapes may be grouped together and their shapes are combined to create a combined token, which is morphologically representative of all of the tokens included in the group. The combined token is further converted into a vectorized token, which is a mathematical representation of the combined token and is capable of representing the shape of the combined token in clean curves. For the scanned-in pages of content, for example, one book, a number of vectorized tokens are created in this manner, each representing a group of similarly shaped tokens. Thereafter, the position of each of the (original, unprocessed) tokens forming a group is associated with the vectorized token that represents the group of tokens. For example, the position of each token may be defined by a page number and the X-Y coordinates of the position within each page at which the token appears, and the position is associated with a pointer to the corresponding vectorized token. Thus, upon rendering, the vectorized token, as opposed to the original token, is displayed at this position to thereby create a page image that consists only of vectorized tokens. Because vectorized tokens are mathematical representations of token shapes, they can be rendered at any resolution, including high resolution, and appear crisp and legible when displayed. Further, because multiple positions of similarly shaped tokens are merely associated with a pointer to their representative vectorized token, the storage requirement for the page images can be minimized.

In accordance with one embodiment of the present invention, a computer-implemented method is provided for converting an electronic image containing text into a token-based file. The method includes generally five steps. First, various tokens (i.e., graphical units) are identified in the electronic image. Second, identified tokens having similar shapes are grouped together to form a token group. Thus, multiple token groups are formed, each including one or more tokens having similar shapes. Third, in each token group, a representative token is generated (or found) that morphologically represents the shapes of tokens included in the group. For example, a representative token may be generated by combining (e.g., averaging) the shapes of tokens in the token group. Fourth, each representative (e.g., combined) token is converted into a vectorized token, which is a mathematical representation of the shape of the representative token. Thus, at this point, muitiple vectorized tokens are created, each mathematically representing the shape of a representative token, which in turn morphologically represents the shape of one or more tokens classified into one token group. Fifth, each of the vectorized tokens is associated with the positions of the tokens represented by the vectorized token, to thereby form a token-based file. In other words, the position of each of the tokens forming a group is associated with the vectorized token that represents the group of tokens. Thus, upon rendering, the vectorized token, as opposed to the original token, is displayed at this position to thereby create a page image consisting only of razor-sharp token images based on the vectorized tokens.

In accordance with one aspect of the present invention, the step of separating tokens is carried out by using a connected component (or a "flood fill") analysis. In accordance with another aspect of the present invention, the step of grouping tokens having similar shapes is carried out by calculating a center of mass for each token, aligning the tokens using the center of mass, calculating the "distance" between a pair of tokens by, for example, calculating a root-mean-square error between the two tokens, and grouping the tokens within a predefined distance with each other. In accordance with a further aspect of the present invention, the step of vectorizing each representative token (e.g., a combined token) to create a vectorized token is carried out based on a raster to vector conversion method using a mathematical representation, such as Bezier splines.

In accordance with a further embodiment of the present invention, a system is provided for converting an electronic image into a token-based file. The system includes generally two components: a page image database for storing electronic images containing text, such as page images; and a computing device in communication with the page image database. The computing device is operative to process the electronic images containing text to identify tokens therein, and to classify the identified tokens into multiple token groups. The computing device is further operative to create a vectorized token, for each of the token groups, which mathematically represents the shapes of the tokens included in the token group, and to generate a token-based file in which each vectorized token is associated with positions of the tokens represented by the vectorized token.

In accordance with a still further embodiment of the present invention, a computer-accessible medium having instructions encoded thereon is provided to create a token-based file. The instructions, when executed by a computing apparatus, cause the computing apparatus to (1) process an image having text therein to identify tokens therein; (2) classify the identified tokens into multiple token groups according to their shapes; (3) for each of the token groups, create a vectorized token that mathematically represents the shapes of the tokens included in the token group; and (4) replace the tokens represented by a vectorized token with the vectorized token.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to a method, system, and computer-accessible medium having instructions for converting an electronic (digital) image containing text, which has been scanned, for example, into a token-based file suitable for high-resolution rendering without requiring an excessive amount of storage space. In an illustrated embodiment, rendering of the token-based file can be done on a variety of output media such as digital displays and print media.

The following detailed description provides exemplary implementations of the invention. Although specific system configurations and flow diagrams are illustrated, it should be understood that the examples provided are not exhaustive and do not limit the invention to the precise forms disclosed. Persons having ordinary skill in the field of computers and digital imaging will recognize components and process steps described herein that may be interchangeable with other components or steps, or combinations of components or steps, and still achieve the benefits and advantages of the present invention. It should also be understood that the following description is presented largely in terms of logic and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. It will be apparent to one skilled in the art, however, that the invention may be practiced without some or all of these specific details. In other instances, well-known process steps have not been described in detail in order not to unnecessarily obscure the invention.

Figure 1:
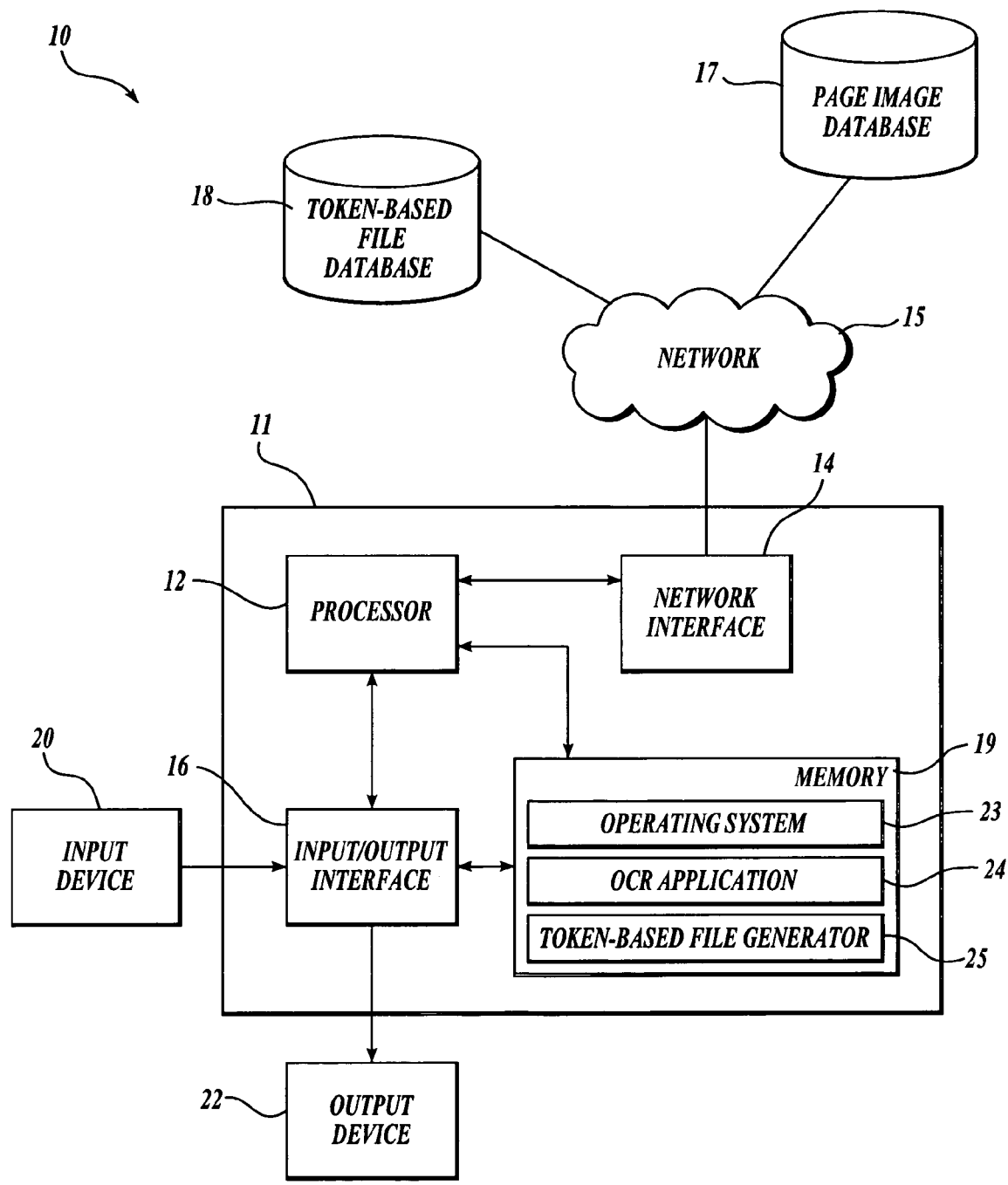
FIG. 1 is a functional block diagram of an exemplary computing system that may be used to implement an embodiment of the present invention.

To provide a context for describing embodiments of the present invention, FIG. 1 illustrates a functional block diagram of a computing system 10 that may be used to implement the present invention. Those having ordinary skill in the art of computers will recognize a wide selection of commercially available components that can be used to construct a system such as the computing system 10 illustrated in FIG. 1. The computing system 10 includes a computing device 11 having a processor 12 in communication with a variety of computing elements, including a network interface 14, an input/output interface 16, and a memory 19. The network interface 14 enables the computing device 11 to communicate data, control signals, data requests, and other information with a computer network 15 (LAN, WAN, Internet, etc.). For instance, the computing device 11 may receive a file containing page images of books, magazines, etc., from a page image database 17 connected to the computer network 15 via the network interface 14. A token-based file database 18 may be connected to the computer network 15, to which token-based files generated by the computing device 11 are sent via the network interface 14 for storage. Persons of ordinary skill in the art will recognize that the computer network 15 may be the Internet, a local or wide area network that connects servers storing related documents and associated files, scripts, and databases, or a broadcast communication network that includes set-top boxes or other information appliances providing access to audio or video files, documents, scripts, databases, etc.

The input/output interface 16 enables the computing device 11 to communicate with various local input and output devices. An input device 20, in communication with the input/output interface 16, may include computing elements that provide input signals to the computing device 11, such as a scanner, a scanning pen, a digital camera, a video camera, a copier, a keyboard, a mouse, an external memory, a disk drive, etc. Input devices comprising scanners and cameras, for example, may be used to provide electronic images such as page images including text to the computing device 11, which then converts these electronic images into a token-based file in accordance with the present invention.

An output device 22, in communication with the input/output interface 16, may include typical output devices, such as a computer display (e.g., CRT or LCD screen), a television, printer, facsimile machine, copy machine, etc. As to the present invention, the output device 22 may be used to display token-based file images for an operator to manually confirm their accuracy and legibility.

The processor 12 is configured to operate in accordance with computer program instructions stored in a memory, such as the memory 19. Program instructions may also be embodied in a hardware format, such as in a programmed digital signal processor. The memory 19 generally comprises RAM, ROM, and/or permanent memory. The memory 19 may be configured to store digital images of text for processing, transmission, and display in accordance with the present invention. The memory 19 stores an operating system 23 for controlling the general operation of the computing device 11. The operating system 23 may be a general-purpose operating system such as a Microsoft® operating system, UNIX® operating system, or Linux® operating system. The memory 19 may further store an optical character recognition (OCR) application 24 comprised of program code and data for analyzing digital images containing text therein. Those of ordinary skill in the art will recognize that there are a wide variety of algorithms and techniques capable of analyzing and recognizing text in an image. For purposes of the present invention, however, it is not necessary that the algorithms and techniques actually recognize the individual characters or symbols as such or interpret their meanings, as achieved by many OCR routines. Examples of commercially available OCR software include OmniPage Pro™ from ScanSoft, Inc., and FineReader™ from SmartLink Corporation. The memory 19 additionally stores a token-based file generator application 25. The token-based file generator application 25 contains program code and data for processing an electronic image containing text received via the network interface 14, the input/output interface 16, etc., to generate a token-based file. The token-based file may then be sent to and stored in the token-based file database 18.

Figure 2:
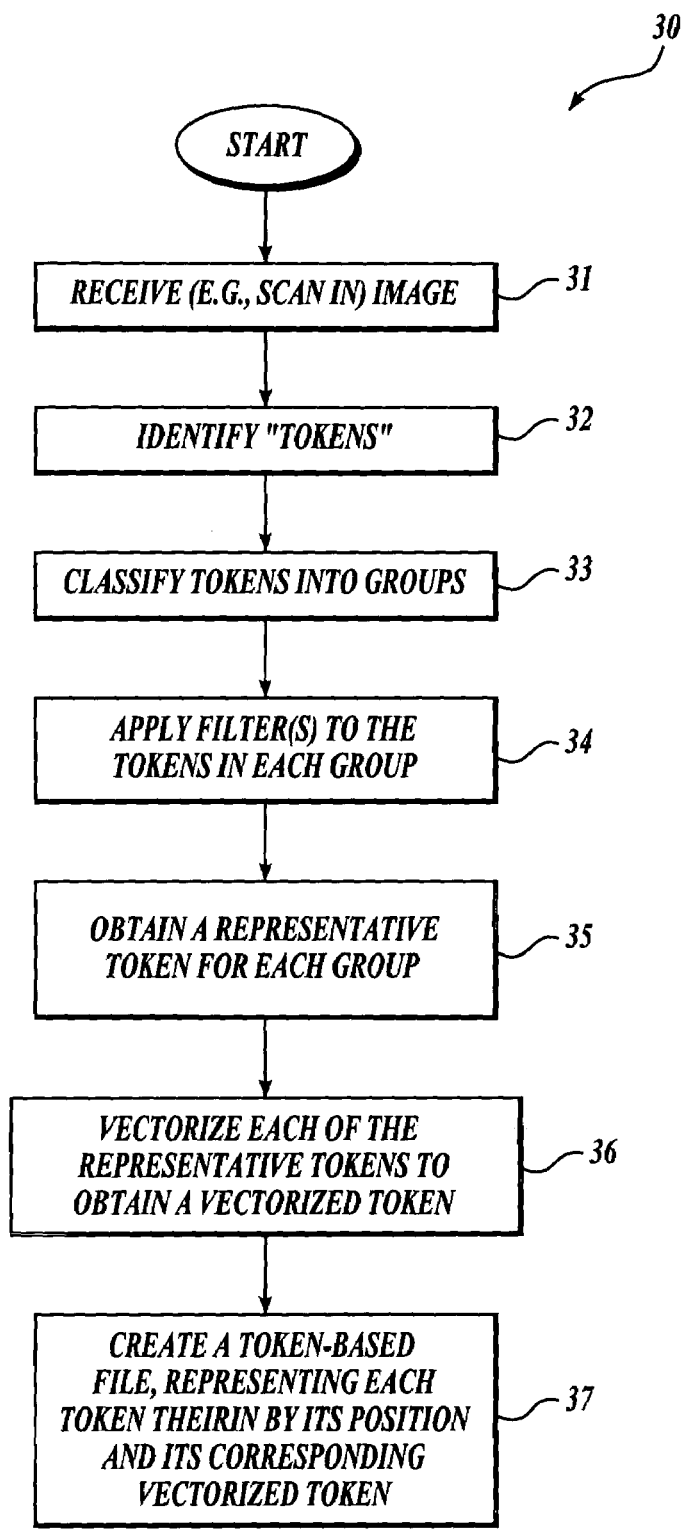
FIG. 2 is a flow diagram of an exemplary method for converting an electronic image containing text to a token-based file according to one embodiment of the present invention.

FIG. 2 is a flow diagram of an exemplary method 30 implemented by the token-based file generator application 25 for converting one or more electronic images containing text to a token-based file according to one embodiment of the present invention. It should be understood that, in the context of the present invention, the term "text" includes all forms of letters, characters, symbols, numbers, formulas, graphics, line drawings, table borders, etc., that may be used to represent information in an electronic image (e.g., a page image). The method 30 starts at block 31 where the computing device 11 receives electronic images (e.g., page images) containing text. For example, page images, as previously scanned into the page image database 17 (FIG. 1), may be retrieved, or page images may be scanned in using a suitable scanner input device 20 (FIG. 1). The received images may be of relatively low resolution, such as in 300 dpi (dots per inch). The format of the page images as received may vary, and can include page images in which the content of the page image is represented in a non-text accessible format, such as in a JPEG, TIFF, GIF, and BMP file, or in which the content of the page image is represented in a text-accessible format, such as in an Adobe Portable Document File (PDF). Regardless of the format in which the page images are received, they may undergo standard OCR or OCR-like preprocessing techniques, such as contrast adjustment, deskewing, despeckling, and/or page rotation correction, prior to undergoing the token-based file generation processing method 30.

At block 32, in the received images of pages having text therein, tokens are identified. A token refers to a graphical unit, which may or may not represent a single character or a symbol. Rather, a token is a unit that is identified to be sufficiently discrete purely in a graphical sense to thereby form a single unit. In various exemplary embodiments of the present invention, a search for tokens in an electronic image occurs within a background region, which is typically white. A token is presumed wherever a pixel color deviates sufficiently from the background color. Then, a connected component analysis (or a flood fill analysis), well known in the art, may be applied to the initial pixel to find its all adjacent (or connected) pixels. In this example, all the pixels associated with a single connected component are identified as a token. However, in other examples, two or more connected components may be identified as a token.

Figure 3:
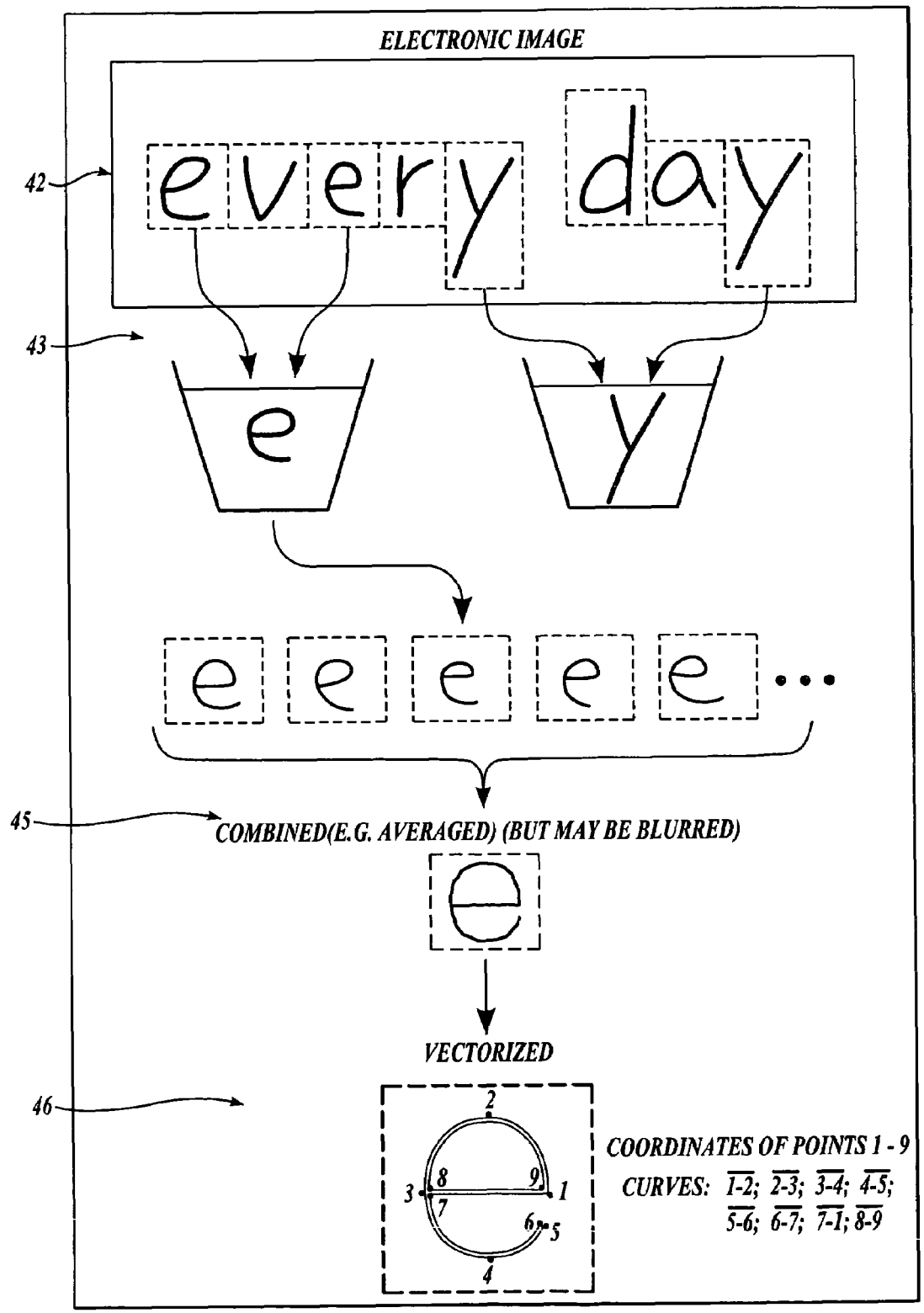
FIG. 3 is a pictorial diagram schematically illustrating some of the steps of a method of converting an electronic image containing text to a token-based file shown in FIG. 2.

Referring to FIG. 3, reference number 42, an electronic image including a text component "every day" is analyzed based on a connected component technique to identify "e," "v," "e," "r," "y," "d," "a," and "y" as separate units, i.e., as tokens. Further, each of these tokens can be bound within a bounding box, as illustrated. The connected component analysis and finding of bounding boxes may be performed using a suitable OCR or OCR-like software program stored in the memory 19 (FIG. 1) as is well known in the art.

In an alternative embodiment, other computational geometry techniques may be used to identify tokens in electronic images. For example, pixels within an electronic image may be represented as a graph having edge weights based on the pixel intensities and edge magnitudes and directions. A connection determination can be made by determining the shortest path between two sets of pixels. If sets of pixels are sufficiently connected, they may be identified as jointly forming a single token.

Figure 4A:
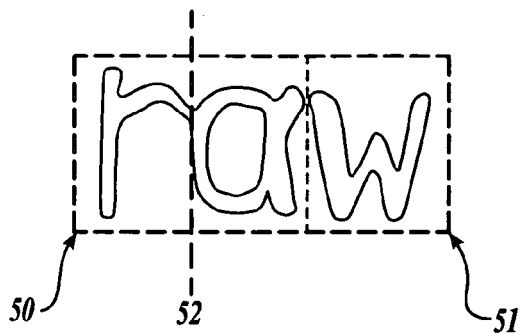
FIGS. 4A-4C illustrate various techniques, which may be used to identify and classify tokens according to their shapes in a method of converting an electronic image containing text to a token-based file in accordance with various embodiments of the present invention.

In some cases, two letters (or characters) may touch each other to form a single connected component, as in the case of "ra" shown in FIG. 4A. In this case, the original word "raw" is separated based on a connected component analysis into two tokens "ra" 50 and "w" 51. While it is not critical for a method of the present invention to identify each letter as a separate token, it may be desirable to do so for the purpose of reducing the number of token types in order to reduce storage requirements. Thus, further processing may be performed to separate out a connected component that may be a combination of two or more letters or symbols. For example, in the case of FIG. 4A, it may be determined that the bounding box for the token "ra" 50 may be too large in its horizontal dimension for this token to be representative of a single letter or a symbol. In general, a token whose bounding box has a longer horizontal dimension than a vertical dimension may be suspected of potentially representing two or more letters or symbols. If so determined, the suspected token may be further analyzed, again using a suitable OCR or OCR-like software program (e.g., a maze algorithm), to identify the shortest path 52 from one side (e.g., the top side) to the other (e.g., the bottom side) to sever the token into two portions. OCR or OCR-like software may also be useful in recognizing, in the above example, that "r" is at a given location so as to make it easier to split it from adjacent letter(s) that it may be touching (i.e., "a" in the above example). Still further, the path along which to possibly sever the token into two portions can be computed by representing the pixels as a graph with edge weights based on the pixel intensities and edge magnitudes and directions. Then, the shortest path 52 can be found between two points on opposite sides of the token (e.g., between the center of the top edge and the center of the bottom edge). In the example of FIG. 4A, the shortest path 52 is found to cut the token "ra" 50 into two tokens, "r" and "a." Thereafter, the accuracy of separated "r" and "a" tokens may be confirmed by comparing the "r" and "a" tokens to other "r" and "a" tokens, respectively, which have already been unambiguously identified as tokens.

In one embodiment, it is better to connect two letters into one token (for example, the token "ra" 50 discussed above), than to separate a letter into two tokens (for example, separating "H" into two vertical sections). The former slightly increases the memory requirements while the latter creates incorrect (or mis-split) tokens that will appear wrong on a page. For example, the letter "H" if mis-split into two vertical sections will appear as the two vertical sections with a gap therebetween. Therefore, ambiguous tokens (i.e., tokens that are suspected of containing two or more letters or symbols) may be evaluated for potential separation into multiple tokens only after all unambiguous tokens have been identified. For example, any ambiguous token may be separated into multiple tokens only if the resulting separated portions will match some unambiguously identified tokens. As a specific example, the token "ra" 50 in FIG. 4A may be separated into "r" and "a" tokens only if each of the resulting separated "r" and "a" tokens will match unambiguously identified tokens "r" and "a," respectively. If each of the resulting separated tokens cannot find a close match with an unambiguously identified token, then the ambiguous token should not be separated into multiple tokens.

Referring back to FIG. 2, at block 33, separated tokens are compared with each other and tokens having similar shapes are grouped together. For example, in FIG. 3, step 43, two "e" tokens from the text "every day" are grouped together as having similar shapes into an "e" bucket, and two "y" tokens from the same text are grouped together as having similar shapes into a "y" bucket. Note that the grouping is carried out based on the morphological characteristics of the tokens. Thus, for example, regular "e" and "e" set forth in bold type may well be treated as having sufficiently different shapes to be grouped into two different buckets. Such a morphology-based or image-based approach to identify and classify tokens is taken so that a resulting token-based file, when rendered, will maintain the overall look and feel of the original electronic image. Accordingly, a single alphanumeric character in the document could be represented by more than one representative token.

Various pattern-matching or shape-matching methods may be used to classify tokens according to their shapes. In various exemplary embodiments of the present invention, a "center of mass" is calculated for each token and is used to align tokens so that they can be compared with each other. As used herein, the "mass" of a pixel in a grayscale image is defined as its deviation from the background color (typically pure white). If the grayscale image is treated as a grid of point masses, one point mass for each pixel, the "center of mass" of the image can be considered as a representative point of the image. If a color image is used with a background also in color, then the "mass" and "center of mass" can still be calculated similarly, by first converting the color image to a grayscale image using any suitable conversion method. The center of mass calculated for each token image may then be used to align token images according to their respective center of mass values.

In an illustrative embodiment, once the tokens have been aligned, the aligned tokens can be compared to determine if the tokens are sufficiently similar. Each pixel in each (grayscale) image may be normalized so that 0.0 represents white and 1.0 represents black. Thereafter, for a pair of images, a "distance" between the images is calculated to ascertain the similarity in shape between the token images. Various methods are possible to calculate such a distance. In one embodiment, one can calculate a distance in terms of a Root-Mean-Square (RMS) error. Specifically, to compare two token images, for each coinciding pair of pixels (i.e., pixels that are at the same location with respect to the center of mass), one can calculate the square of the difference in grayscale (color) values, take the sum of the square values over all coinciding pixels, divide the sum by the number of coinciding pixels, and finally take its square foot to produce the RMS error value. The RMS error value of 0.0. means that the two images are identical, while any larger RMS error value indicates that the two images are increasingly different from each other. In one embodiment, the two token images may be considered the same or sufficiently similar in shape to each other so as to belong to the same token group if the RMS error value is no more than a predefined threshold value, such as 0.10.

Figure 4B:
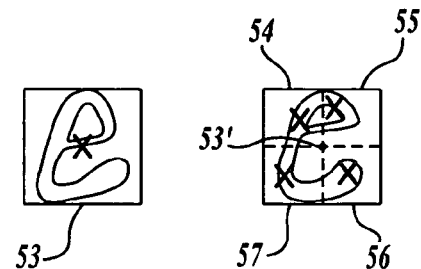

FIG. 4B illustrates a token "e" in a bounding box 53, in which a center of mass is found at point "x." Various alternative methods for aligning and/or comparing tokens based on their center of mass values are possible. For example, still referring to FIG. 4B, a bounding box may be divided using horizontal and vertical lines through the center of mass point 53' into multiple sections, such as four sections 54, 55, 56, and 57 as illustrated. Center of mass values may be found for the four sections, respectively, at four points "x" as indicated. The four center of mass values may be represented as (x, y) coordinate values relative to the center of mass point 53' used as the origin. Then, the four center of mass values may be respectively compared with the corresponding center of mass values of another token from a token group (e.g., by taking the average squared difference between the two sets of the four center of mass values), to roughly determine which token group the token at issue might belong in. The comparison of only four center of mass values, as in this example, significantly speeds up the preliminary matching process, especially if there exist numerous token groups to compare the token against. However, if a match is found according to this method, a true match may be confirmed using a more comprehensive comparison test, such as the RMS error based method described above.

Additionally or alternatively to the use of four center of mass values, as discussed above, various other methods may be used to preliminarily classify a token into a candidate token group in which the token may belong. For example, OCR or OCR-like processing may be performed to obtain letter information such as the actual character detected and various formatting details such as a font, an approximate font size, whether the letter is bold, italic, or underlined, etc. If two tokens are detected to have the same OCR character and about the same size, it may be preliminarily determined that the two tokens are similar in shape to each other. As before, however, even if a match is found according to this method, a true match may still be confirmed using a more comprehensive comparison method, such as the RMS error based method.

Other comprehensive graphical analysis techniques for estimating and comparing the shapes of various tokens, which may not necessarily use the RMS error analysis described above, may also be employed in accordance with the present invention as would be apparent to one skilled in the art. For example, a sum of blackness analysis may be used to compare the shapes of various tokens. Another example is a cross-entropy method. Given two tokens A and B, the cross-entropy of B with respect to A can be calculated by compressing the token image for B using the information in the token image for A as a guide. Then, the number of bits in the final compressed file for the token image B is taken. Similarly, the cross-entropy of A with respect to B can be calculated by compressing the token image for A using the information in the token image for B and by taking the number of bits in the final compressed file for the token image A. Then, the maximum between the cross-entropy of A with respect to B and the cross-entropy of B with respect to A is taken, and used as a measure of "distance" (i.e., closeness in shape) between the two token images.

Figure 4C:
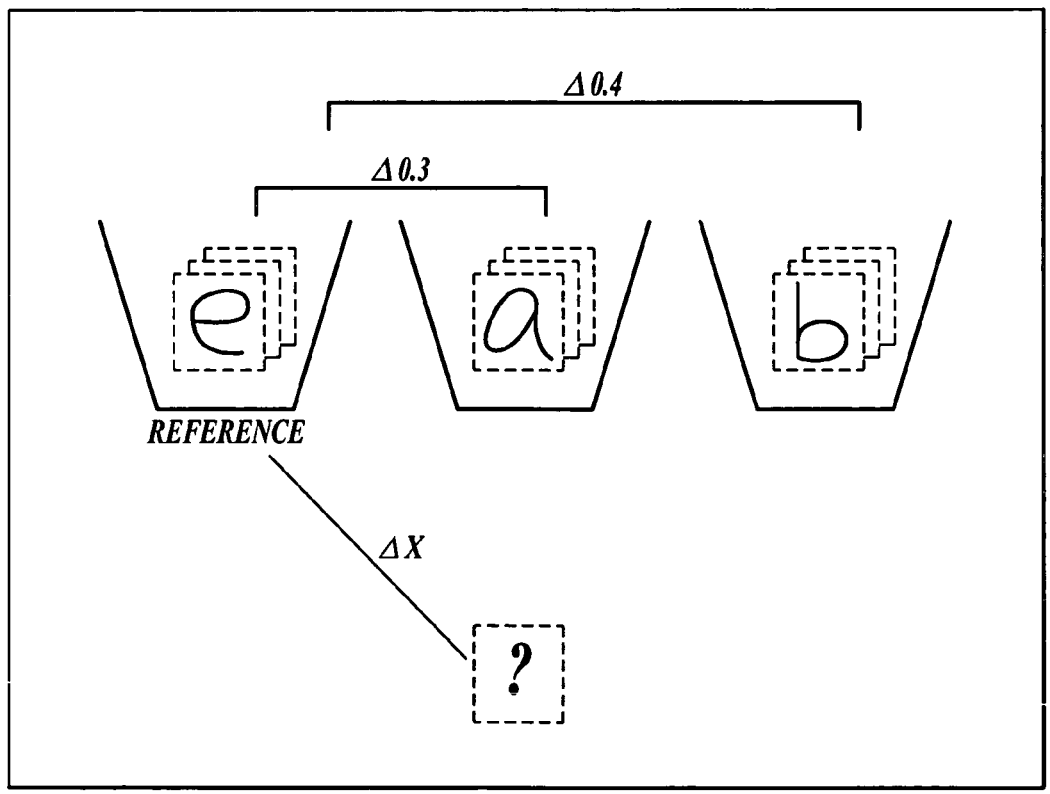

With continued reference to block 33, in an illustrative embodiment, similarly shaped tokens can be classified together to form a token group. FIG. 4C schematically illustrates one technique suitable for use in classifying various shaped tokens into many token groups. Essentially, a search tree or a classification tree may be built so as to speed up the classification process. As well know in the art of computer-based searching and classification, a search tree or a classification tree comprises a branching structure in which each state (node) may give rise to a new set of states (child nodes) and each of these may in turn give rise to successor states of its own (grandchild nodes), and so on. By building such a tree for tokens according to their shapes (e.g., based on their RMS error values with respect to a certain reference image), and traversing the tree from a root node, to a child node, to a grandchild node, and so on, a computer routine may rapidly classify new tokens into various token groups (forming leaf nodes).

In the example of FIG. 4C, token groups for "e," "a," and "b" have been formed. Further, the difference between the token groups for "e" and "a" (for example in terms of the RMS error value between the "e" token image and "a" token image) has been found to be 0.3, and the difference between the token groups for "e" and "b" has been found to be 0.4. In this example, the "e" token group is used as a reference point. Then, the RMS error value between the next token to be classified "?" and the "e" token group is calculated as "Δ." If Δ.x is less than 0.3, then "?" can be classified into a new token group that has not yet been created, because no existing token group differs from "e" token group by less than 0.3. Likewise, if Δ.x is more than 0.4, then "?" can be classified into a new token group that has not yet been created, because no existing token group differs from "e" token group by more than 0.4. Thus, only when $0.3 \leq \Delta.x \leq 0.4$, it is necessary to compare "?" with the token groups for "a" and "b," respectively, to see if "?" belongs to either of these token groups, or perhaps belongs to a new token group that has not yet been created. The comparison can be carried out, for example, by calculating the RMS error value between the "?" token image and the "e" token image or the "a" token image. Using a suitable search tree or classification tree, various shaped tokens may be rapidly classified into token groups according to their shapes.

Once all of the tokens found in page images, for example in a book, are classified into various token groups, the tokens in each group may undergo any suitable image processing or preprocessing. Specifically, referring back to FIG. 2, at block 34, optionally, various digital image processing filters may be applied to the tokens classified in each group to, for example, smooth out the outlines of tokens, remove obvious artifacts, etc. Various filters in this regard are known in the art, and may be part of a commercially available OCR or OCR-like software program stored in the memory 19 (FIG. 1).

At block 35, for each token group, a representative token that morphologically represents all the tokens classified in the token group is found. For example, all the tokens in the token group may be combined to obtain a combined token. Various methods for combining tokens or, more specifically, token shapes, are possible, such as averaging, taking a median, etc., as will be apparent to one skilled in the art. In various exemplary embodiments of the present invention, a representative token is found as an averaged token (FIG. 3). Averaging can be performed by aligning the center of mass points of all token images and taking the average of every pixel location (e.g., by taking each coinciding pixel and calculating the average color (grayscale) value for each pixel, by summing all the color (grayscale) values and dividing the sum by the number of token images). Additionally, interpolation may be performed to obtain sub-pixel level average values. When an averaged token is created from averaging all of the token images in a token group, various imperfections or artifacts that may have been present in the original token images will be averaged away (or minimized) to produce generally smoothed edges, albeit at the potential price of increased blurriness.

It should be noted that, in some embodiments, not all the tokens included in a token group need to be combined (e.g., averaged) to produce a combined token. For example, when there is a large number of tokens in a token group, such as over 1000 tokens, then it may not be necessary to average all the tokens because the quality of the averaged token image does not increase appreciably after a few hundred tokens. In such a case, only 100 or so "closest" token images may be taken and averaged to produce an averaged token.

At block 36, a representative (e.g., combined or averaged) token, which morphologically represents the shapes of all the tokens in a token group but with some blurriness, is converted into a vectorized token, which is a mathematical representation of the representative token. As used herein, the term "vectorize" refers to the process of finding an outline that best represents the shape of a representative token and representing the outline in mathematical formulae (together with suitable fill instructions to fill any enclosed portions). Any suitable raster-to-vector conversion software for converting bitmaps into vector graphics may be used for vectorizing representative tokens, according to the present invention. In an illustrative embodiment, additional preprocessing techniques, such as contrast adjustment, deskewing, despeckling, and/or page rotation correction, may be utilized prior to vectorization at block 36.

In some exemplary embodiments of the present invention, an outline for a representative token is found based on the analysis of token regions. Specifically, each representative token is divided into two or more regions. For example, a letter "e" has three regions: a background; a solid portion representing "e"; and the semicircle-shape hole in the upper portion of "e". An outline can be found as a collection of boundaries between any adjacent regions. For example, an outline of "e" can be found as a boundary between the background and the solid portion "e" in combination with another boundary between the solid portion and the semicircle-shape hole. Similarly, a letter "i" has three regions: a background and two solid portions; and its outline can be found as a boundary between the first (top) solid portion and the background in combination with another boundary between the second (bottom) solid portion and the background.

Further, various methods are possible for mathematically representing the outline of a representative token. For example, Bezier arc/curve representation techniques, well known in the art of computer font rendering, may be used to represent any outlines based on control points and curves (including lines) between each adjacent pair of control points. Referring additionally to FIG. 3, at 46, for example, a vectorized token "e" is represented by nine end points 1-9 and mathematical formulae representing nine curves between each adjacent pair of the end points: 1-2, 2-3, 3-4, 4-5, 5-6, 6-7, 7-1, and 8-9. Each adjacent pair of end points also has two other control points that are used to control the appearance (or "curviness") of the Bezier curve. In one embodiment of the present invention, the number of Bezier curves used to define each curve of a representative token may vary depending on how frequently the representative token (or, more specifically, the tokens represented by the representative token) appears in a document. For example, some tokens will occur thousands of times in a document while others may occur only a few times. By allowing more Bezier curves to be used to define the frequently occurring tokens, one can improve the image quality for the vast majority of tokens in the document, while still achieving excellent compression of the infrequently occurring tokens.

Other mathematical representation techniques, such as B-spline or Hermite techniques, may also be used to define a vectorized token, as will be apparent to one skilled in the art. Since a vectorized token is a mathematical representation of a shape, it can be rendered at any resolution, for example at a relatively high resolution such as in 2400 dpi or even in 19200 dpi. Also, a vectorized token is significantly compressed in terms of its memory space, as compared to any of the original tokens that it represents. For example, in various exemplary embodiments of the present invention, it may take as few as 180 bytes to represent a single vectorized token.

Accordingly, many vectorized tokens may be defined, each representing a group of tokens having similar shapes. For example, page images from a 200-page book may be processed to create over 2,000 vectorized tokens to each represent a group of similarly shaped tokens. Note that all of the tokens that were initially identified in the book are now represented by one of the 2,000 plus vectorized tokens. Note also that a method of the present invention defines vectorized tokens without recognizing them as specific characters or of certain font type. Rather, a method defines vectorized tokens purely as images based on the analysis of the morphological features of all tokens found in the original document, such as in a book that has been scanned in. This image-based approach to processing a scanned-in document is one of the keys for creating a token-based file, which can be rendered in high resolution while maintaining the same look and feel as the original document in print.

Referring to FIG. 2, at block 37, a token-based file is created based on the vectorized tokens previously defined in block 36. In this file, each vectorized token is assigned a token number, and the position of each of the tokens forming a token group is associated with the vectorized token (or, more specifically, its token number) that represents the group of tokens. For example, the position of each token may be defined by a page number and the X-Y coordinates of the position within each page at which the token appears, and the position is associated with a pointer to the corresponding vectorized token. Thus, upon rendering, the vectorized token as opposed to the original token is displayed at this position to thereby create a page image consisting only of vectorized tokens. Because vectorized tokens are mathematical representations of token shapes, they can be rendered at any resolution including high resolution, and appear crisp and legible when displayed. Further, because multiple positions of similarly shaped tokens are merely associated with a pointer to their representative vectorized token (having a small memory size), there is no need to store the original tokens for these positions and, therefore, the storage requirement for the page images can be minimized. For example, on average, a book can be converted into a token-based file having the memory size of approximately 2 MB. Still further, due to the small memory size of each vectorized token (e.g., 180 bytes), very fast rendering of a token-based file is possible. Still further, the token-based file may be further rendered on any number of print media.

While illustrative embodiments of the invention have been illustrated and described, it will be appreciated that various changes can be made therein without departing from the spirit and scope of the invention.

The invention claimed is:

1. A computer-accessible medium having instructions encoded thereon to create a token-based file, wherein the instructions, when executed by a computer, cause the computer to:

process an image to identify one or more tokens, wherein the image corresponds to scanned images of a book;

classify the identified tokens into multiple token groups according to shapes of the tokens;

for each of the token groups, create a vectorized token that mathematically represents the shapes of the tokens included in the token group;

generate a set of vectorized tokens representative of the image for rendering on an output media.

2. The computer-accessible medium of claim 1, wherein at least two tokens correspond to the same alphanumeric character.

3. The computer-accessible medium of claim 1, wherein the output media is a hand-held media device.

4. The computer-accessible medium of claim 1, wherein the output media is print media.

5. A computer-implemented method for converting an electronic image into a token-based file, comprising:

identifying tokens in the electronic image;

classifying tokens having similar shapes into a group, to thereby form multiple token groups;

identifying a representative token that morphologically represents the shapes of tokens in each token group, to thereby identify multiple representative tokens;

vectorizing each representative token to create a vectorized token that mathematically represents the shape of the representative token; and associating each vectorized token with positions of the tokens represented by the vectorized token.

6. The computer-implemented method of claim 5, wherein classifying tokens having similar shapes into a group comprises classifying tokens that have both similar shapes and similar sizes into a group.

7. The computer-implemented method of claim 5, wherein identifying a representative token that morphologically represents the shapes of tokens in each token group comprises combining the shapes of tokens in each token group to create a representative token that is a combination of the tokens in the token group.

8. The computer-implemented method of claim 7, wherein combining the shapes of tokens in each token group comprises averaging the shapes of tokens to create an averaged token.

9. The computer-implemented method of claim 5, wherein identifying tokens in the electronic image comprises using a connected component analysis.

10. The computer-implemented method of claim 9, wherein identifying tokens in the electronic image comprises, when a connected component is found to be larger than a predefined threshold size, separating the connected component along its shortest path to thereby identify two tokens.

11. The computer-implemented method of claim 5, wherein identifying tokens in the electronic image comprises using an edge graph analysis wherein pixels are represented as a graph with edge weights based on pixel intensities, edge magnitudes, and directions.

12. The computer-implemented method of claim 5, wherein classifying tokens having similar shapes into a group comprises:
    calculating a center of mass for each token; and
    aligning the tokens according to their values of center of mass.

13. The computer-implemented method of claim 12, wherein calculating a center of mass for each token further comprises:
    separating each token into two or more sections; and
    calculating a center of mass for each of the sections.

14. The computer-implemented method of claim 5, wherein classifying tokens having similar shapes into a group comprises using an error analysis technique to compare the tokens.

15. The computer-implemented method of claim 14, wherein classifying tokens having similar shapes into a group comprises using a root-mean-square (RMS) error analysis to compare the tokens.

16. The computer-implemented method of claim 5, wherein vectorizing each representative token to create a vectorized token comprises mathematically representing the shape of the representative token in Bezier curves.

17. The computer-implemented method of claim 5, wherein associating each vectorized token with positions of the tokens represented by the vectorized token comprises storing a pointer to the vectorized token in association with the positions.

18. A computer-accessible medium having instructions encoded thereon to create a token-based file, wherein the instructions, when executed by a computer, cause the computer to:
    process an image to identify tokens therein;
    classify the identified tokens into multiple token groups according to their shapes;
    for each of the token groups, create a vectorized token that mathematically represents the shapes of the tokens included in the token group; and
    replace the tokens represented by a vectorized token with the vectorized token.

19. The computer-accessible medium of claim 18, wherein the tokens included in each token group are combined prior to creation of a vectorized token for the token group.

20. The computer-accessible medium of claim 18, wherein each vectorized token comprises Bezier arcs.

21. The computer-accessible medium of claim 20, wherein the tokens represented by a vectorized token are replaced with a pointer to the vectorized token.

22. A computer-accessible medium having instructions encoded thereon to create a token-based file, wherein the instructions, when executed by a computer, cause the computer to:
    process an image to identify tokens therein;
    classify the identified tokens into multiple token groups according to their shapes;
    for each of the token groups, create a vectorized token that mathematically represents the shapes of the tokens included in the token group; and
    generate a set of vectorized tokens representative of the image.

23. The computer accessible medium of claim 22, wherein the computer classifies tokens that have both similar shapes and similar sizes into a group.

24. The computer accessible medium of claim 22, wherein the computer classifies the shapes of tokens in each token group to create a representative token that is a combination of the tokens in the token group.

25. The computer accessible medium of claim 24, wherein the computer classifies the shapes of tokens to create an averaged token.

26. The computer accessible medium of claim 22, wherein the computer classifies tokens having similar shapes into a group by calculating a center of mass for each token and aligning the tokens according to their values of center of mass.

27. The computer accessible medium of claim 22, wherein the computer uses an error analysis technique to compare the tokens.

28. The computer accessible medium of claim 22, wherein vectorizing each representative token to create a vectorized token comprises mathematically representing the shape of the representative token in Bezier curves.

* * * * *

UNITED STATES PATENT AND TRADEMARK OFFICE
CERTIFICATE OF CORRECTION

PATENT NO. : 7,460,710 B2 Page 1 of 1
APPLICATION NO. : 11/392213
DATED : December 2, 2008
INVENTOR(S) : Adam Brian Coath et al.

It is certified that error appears in the above-identified patent and that said Letters Patent is hereby corrected as shown below:

At column 2, line 60, please change "muitiple" to --multiple--.

At column 8, line 23, please change "foot" to --root--.

Signed and Sealed this

Ninth Day of June, 2009

JOHN DOLL
*Acting Director of the United States Patent and Trademark Office*